Nov. 2, 1948.  J. L. McFARLAND  2,452,588
CABLE AND CABLE CONNECTOR FATIGUE TESTING MACHINE
Filed Oct. 2, 1945  3 Sheets-Sheet 1

INVENTOR
JOSEPH L. McFARLAND
KENNETH MATZINGER
BY
ATTORNEY

Patented Nov. 2, 1948

2,452,588

UNITED STATES PATENT OFFICE 2,452,588

CABLE AND CABLE CONNECTOR FATIGUE TESTING MACHINE

Joseph Luther McFarland, Cairo, W. Va., and Kenneth Matzinger, Detroit, Mich.

Application October 2, 1945, Serial No. 619,912

3 Claims. (Cl. 73—109)

(Granted under the act of March 3, 1883, as amended April 30, 1928; 370 O. G. 757)

1

The invention described herein may be manufactured and used by or for the Government for governmental purposes, without the payment to us of any royalty thereon.

The invention to be hereinafter described relates to fatigue testing equipment for cables.

Wire cables, woven or braided, such as used for electrical conductors especially where used as connecting elements in machinery and for connections between relatively moving parts are subject to flexing, twisting and other stresses and strains which eventually mechanically destroy them and greatly affect their electrical conductivity. The same is true of wires and flexible members of all types singly and not in rope form. Various materials, as well as various constructions of any given material possess varying degrees of ability to resist such stresses. As is well understood, the outermost layer or covering of a coaxial cable, whether of conducting or insulating material is subject to the same deterioration when subjected to flexing or twisting. Determination of ability to resist such deterioration whether mechanical resistance or electrical resistance, is commonly referred to as fatigue testing and the equipment as fatigue testing equipment. Heretofore, such testing has regularly involved bending or flexing the particular specimen in one direction at a time only. As is well understood, such tests are usually continued either to destruction or to a predetermined point or limit.

For instance, the section to be tested may be subjected to a predetermined number of twisting stresses or flexing stresses at so many per minute or to so many hours or other length of time of twisting or of flexing.

The present invention is adapted to simultaneously apply testing stresses separately to several independent sections of cable or other flexible conductors, the stresses applied to one section being of a different nature than those applied to another. It is also adapted to enable determination of change of electrical resistance resulting from the tests.

Among the objects of the present invention is the provision of a simple, compact, efficient fatigue testing equipment capable of simultaneously testing a plurality of separate and independent flexible sections, adjustable to vary the testing action, arranged to simultaneously apply different characters of stress to different independent sections, and so constructed as to allow determination of variations of electrical resistance of any particular section being tested.

2

In order to more clearly disclose the construction, operation and use of the invention reference should be had to the accompanying drawings forming part of the present application.

Throughout the several figures of the drawings like reference characters designate the same parts in the several views.

Figure 1:
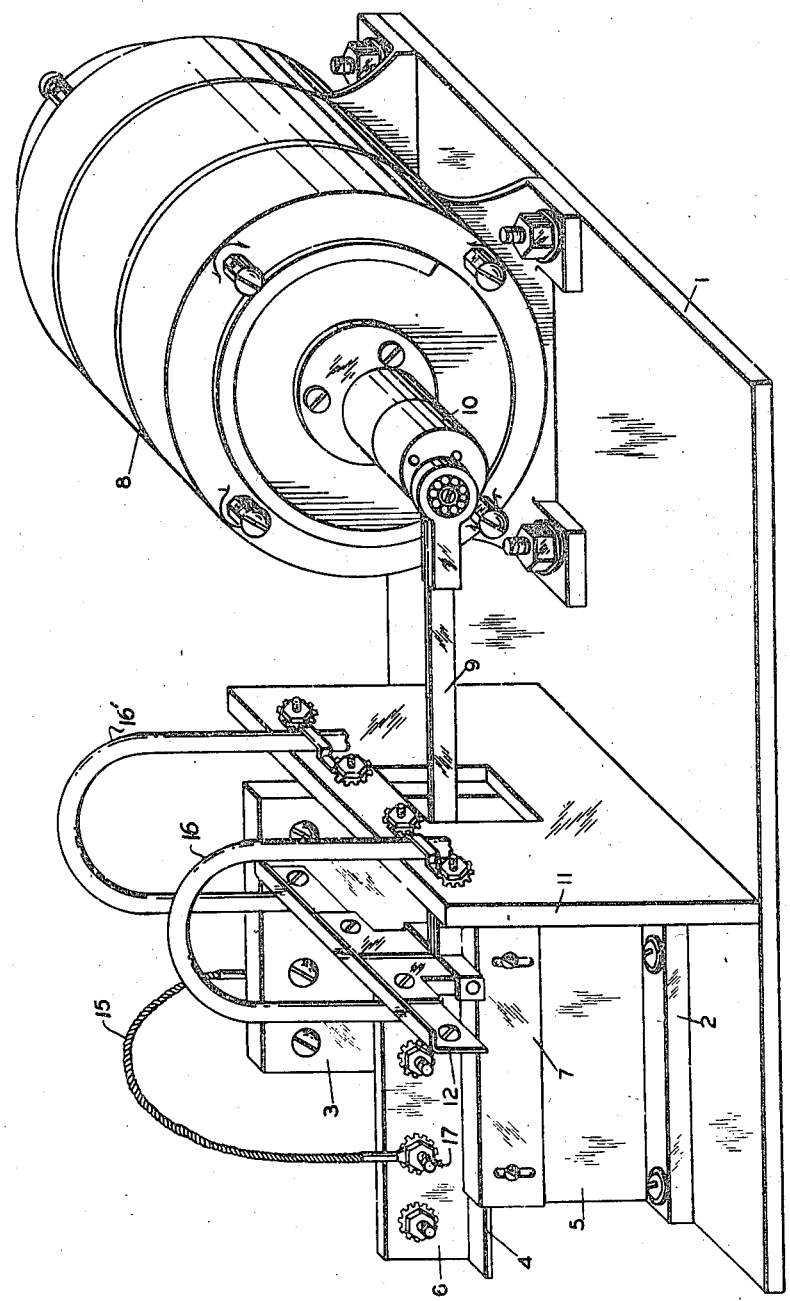
Fig. 1 is a perspective view of a fatigue testing machine embodying the present invention.
Figure 2:
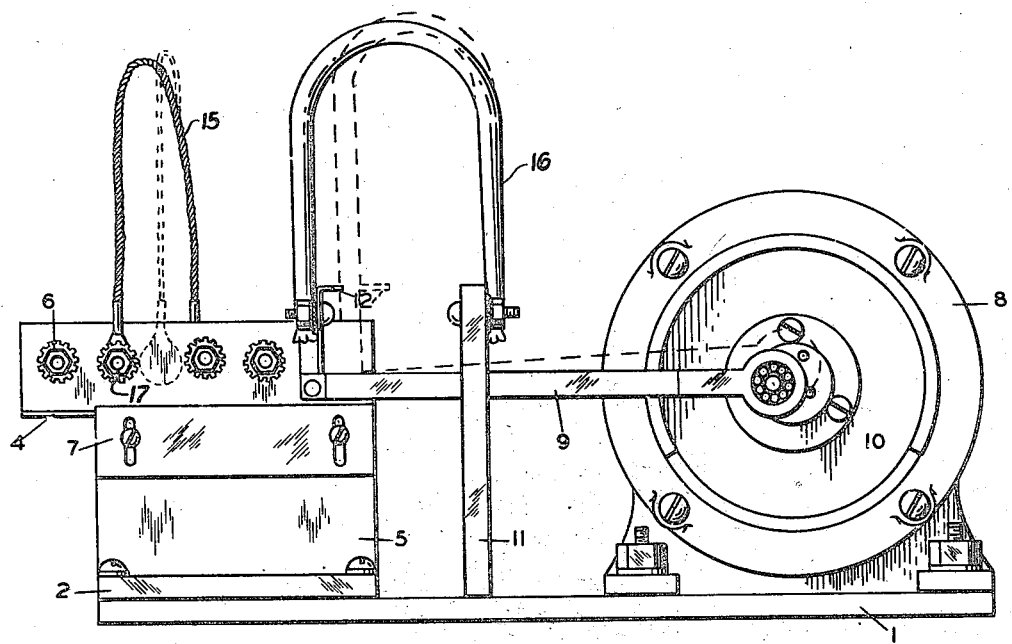
Fig. 2 is a front elevation, a second position of the movable plates being indicated in dotted lines.
Figure 3:
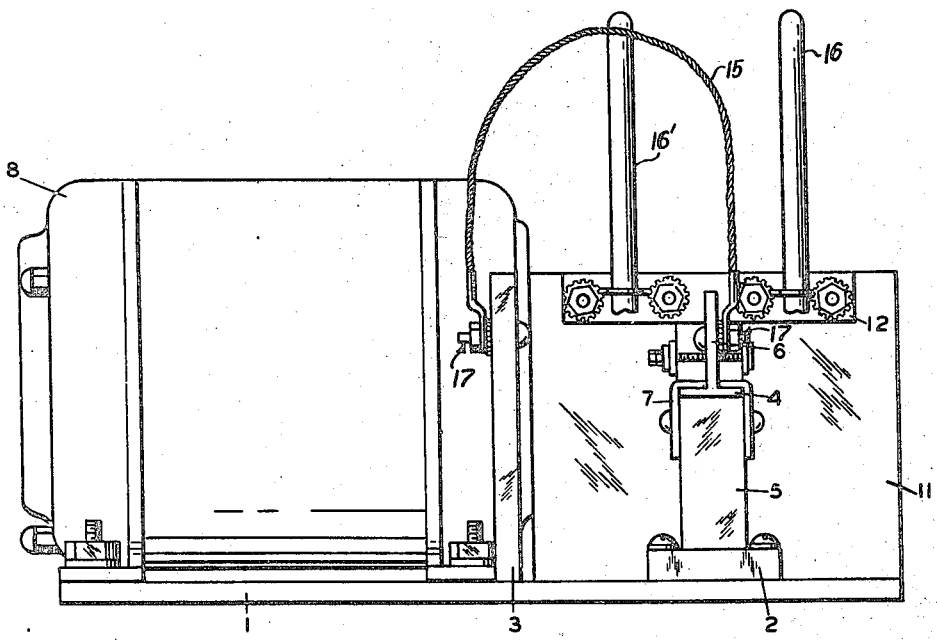
Fig. 3 is a left hand elevation of Fig. 2.
Figure 4:
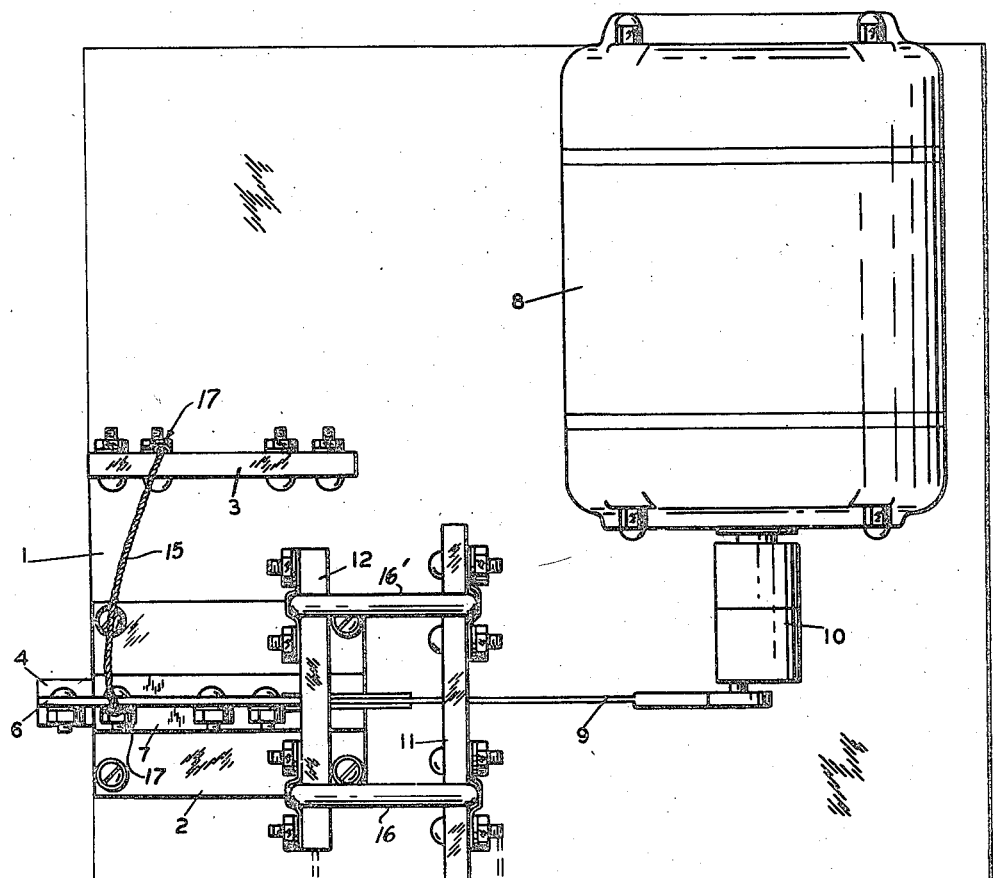
Fig. 4 is a plan view.

On a suitable base 1 of any desired material and construction may be mounted the several operating parts.

On base 1 is secured, in any well known manner, a suitable frame 2. The base 1 also carries, at one side, an up-right, stationary or fixed attaching or anchor plate 3 to which, as will hereinafter appear, may be readily attached the ends of cable sections to be tested. The opposite ends of these sections may be secured, in well known manner, to a carriage 4 reciprocably mounted on a guide track or rail 5 which is parallel to and spaced from plate 3 on frame 2. The carriage 4, includes a long narrow plate 6 to which the cable section ends may be connected. Cooperating with rail 5 are a pair of adjustably spaced, parallel angle iron or L-shaped carriage guide plates 7. Properly constructed and disposed, the carriage, in assembled relation, supports plate 6 in balanced relation as to 5 or, approximately, coincident with the vertical plane of the longitudinal axis of 5.

In order to reciprocate carriage 4 a motor 8 and pitman rod 9 are provided, the pitman rod being connected at opposite ends, respectively, to the carriage and to the motor shaft. In order to provide variation in the throw or travel of the pitman rod and attached carriage, a hub 10 of greater diameter or a disc may be secured to and revoluble with the motor shaft. To effect variation in throw of the pitman it is only necessary to attach the pitman to the hub or disc at different distances radially relatively to the motor shaft, as will be well understood. The connections between the ends of the pitman and the hub and carriage, respectively, may be of any usual and well known type.

By anchoring the ends of a cable section 15 to the anchor plate 3 and the carriage 4, respectively, and reciprocating said carriage 4, said cable section 15 will be submitted to twisting stresses, as distinguished from flexing or bending stresses.

In order to submit cable sections to bending or flexing stresses, a second stationary anchor plate 11 and a traveling bar 12 are provided, plate 11 being suitably mounted on base 1, disposed substantially at right angles to plate 3 and guide rail 5 and being provided with an opening therethrough for the clearance and free travel of pitman 9.

Bar 12, preferably, is carried by and reciprocates with carriage 4. It is disposed parallel with plate 11, is spaced therefrom at its nearest approach thereto, is of approximately the same length as plate 11 and has its upper edge arranged at about the same distance above base 1 as that of plate 11.

As carriage 4 is reciprocated, as above set forth, bar 12 will be correspondingly moved relatively to plate 11. By anchoring opposite ends, respectively, of cable sections 16, 16' to plate 11 and bar 12, and reciprocating bar 12, said cable sections 16, 16' may be subjected to flexing or bending stresses.

By having one or more cable sections 16, 16' anchored to plate 11 and bar 12, as above, and one or more cable sections 15 anchored to plate 3 and carriage 4, as previously stated, and reciprocating the carriage 4 and attached bar 12, the said cable sections may be simultaneously but separately subjected to bending or flexing stresses and to twisting stresses.

Although single cable sections may be tested at a time, it will be clear that a plurality of sections may be simultaneously tested. It will be equally obvious that different sizes and types may be tested at the same time and that cables of different materials may be simultaneously tested.

Where it is desired to determine the limit or extreme extent to which a cable may be submitted the tests will be continued to the point of destruction, accurate record being kept in well known manner. On the other hand, where it is desired to determine whether or not a given cable will withstand a given amount of flexing or twisting stress, the test will be conducted to that point and, if the section is not destroyed, stopped, an accurate record being kept in well known manner, as in the other instance.

One of the weak points is at the cable or bond end where the flexible member is received in a sleeve or sheath of a terminal 17. The terminals 17 are substantially rigid and unyielding. It follows that there is relative movement between the rigid terminal and the flexible cable at that point every time the cable is flexed or twisted. Consequently, this equipment thoroughly tests the fatigue effects at that point.

Preferably, plates 3 and 11 are of insulating material so that two or more terminals of cables connected thereto in spaced relation will be electically insulated from each other. On the other hand, carriage 4 and traveling plate 12, preferably, are conductive so that two or more terminals of cables connected thereto are electrically connected together. In testing the electrical resistance of any given cable section it is only necessary to connect the terminals of a well known type of resistance meter to the stationary end of the cable section and to the carriage 4 or movable bar 12, respectively, before the test and at the time of completing the test. And where pairs of like samples are being flexed the series resistance of the pair may be measured by connecting the resistance meter to the two stationary ends of the pair regardless of whether they terminate at stationary plate 3 or 11 or both, thus enabling measurements to be made during operation of the equipment. It will be seen that these series measurements are independent of any loose or sliding contacts due to the operation of the machine. It will then be obvious that, by this invention, a resistance reading may be taken at any time either during operation of the equipment or when it is not operating. Also, the reading may be watched over a period of time during operation and the variations noted as they develop. The difference in readings will be the measure of resistance of the cable section after the test.

It is thought that the construction, operation and use of the invention will be clear from the preceding detailed description.

Changes may be made in the construction, arrangement and disposition of the various parts of the invention, within the scope of the appended claims without departing from the field of the invention and it is meant to include all such within this application wherein only one preferred form has been illustrated purely by way of example and with no thought of, in any degree, limiting the invention thereby.

Having thus described our invention, what we claim and desire to protect by Letters Patent is:

1. In a machine for fatigue testing cable-like elements, a horizontally disposed base, a vertically disposed guide rail secured to said base, a carriage reciprocally movable along the top of said guide rail, a vertically disposed reciprocable plate parallel to said guide rail and secured to and extending upwardly from said carriage, a traveling bar disposed perpendicularly to said reciprocating plate and extending upwardly from said carriage, means to reciprocate said carriage, a first vertically disposed anchor plate secured to said base and parallel to said reciprocating plate, a second vertically disposed anchor plate secured to said base and parallel to and opposing said traveling bar, anchoring means on said reciprocating plate, said traveling bar and said first and second anchor plates, each of said anchoring means being adapted to secure one end of one of said elements, at least one anchoring means on the first anchor plate being spaced from the plane of the axis of reciprocal movement of a corresponding anchoring means on the reciprocal plate and at least one anchoring means on the second anchor plate being in the same plane as the plane of the axis of reciprocal movement of a corresponding anchoring means on the traveling bar.

2. Equipment for fatigue testing cable-like elements including two stationary anchor plates disposed approximately at right angles to each other, a carriage reciprocable in a plane parallel to one of said plates and perpendicular to the other, said carriage being provided with a reciprocating plate parallel to said plane and a traveling bar perpendicular to said plane, means for anchoring the ends of said elements to the reciprocating plate, the traveling bar and the two stationary anchor plates, and means for reciprocating said carriage so as to simultaneously reciprocate said reciprocating plate and said traveling bar, whereby to twist and flex elements connected to the reciprocating plate and the anchor plate parallel thereto and to flex elements connected to the traveling bar and the other anchor plate.

3. Equipment for fatigue testing cable-like elements including two stationary anchor plates disposed approximately at right angles to each other, a carriage reciprocable in a plane parallel to one of said plates and perpendicular to the other, said carriage being provided with a reciprocating plate parallel to said plane and a traveling bar perpendicular to said plane, means for anchoring the ends of said elements to the reciprocating plate, the traveling bar and the two stationary anchor plates, means for reciprocating said carriage so as to simultaneously reciprocate said reciprocating plate and said traveling bar, whereby to twist and flex elements connected to the reciprocating plate and the anchor plate parallel thereto and to flex elements connected to the traveling bar and the other anchor plate, and means for varying the extent of such simultaneous reciprocations of said reciprocating plate and said traveling bar.

JOSEPH LUTHER McFARLAND.
KENNETH MATZINGER.

REFERENCES CITED

The following references are of record in the file of this patent:

UNITED STATES PATENTS

| Number | Name | Date |
|---|---|---|
| 1,485,835 | Bothezat et al. | Mar. 4, 1924 |
| 1,882,815 | Haegele et al. | Oct. 18, 1932 |
| 2,243,413 | Buckingham | May 27, 1941 |
| 2,393,177 | Longfellow | Jan. 15, 1946 |

FOREIGN PATENTS

| Number | Country | Date |
|---|---|---|
| 493,268 | Great Britain | Apr. 12, 1937 |
| 540,805 | Germany | Dec. 30, 1931 |